(12) United States Patent
Roy

(10) Patent No.: US 8,116,742 B2
(45) Date of Patent: *Feb. 14, 2012

(54) SYSTEM AND METHOD OF RETRIEVING ELECTRONIC MAIL

(75) Inventor: Shaibal Roy, Sammamish, WA (US)

(73) Assignee: Teamon Systems, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/103,260

(22) Filed: May 9, 2011

(65) Prior Publication Data

US 2011/0212710 A1 Sep. 1, 2011

Related U.S. Application Data

(63) Continuation of application No. 10/780,258, filed on Feb. 17, 2004, now Pat. No. 8,005,462.

(51) Int. Cl.
*H04M 1/663* (2006.01)

(52) U.S. Cl. ............... 455/412.2; 455/414.1; 455/414.2; 709/216

(58) Field of Classification Search ....... 455/412–414.4, 455/466; 709/204–207, 209, 211, 219; 370/349, 370/395.72, 363, 428, 429, 471
See application file for complete search history.

(56) References Cited

U.S. PATENT DOCUMENTS

| | | | |
|---|---|---|---|
| 5,958,006 A * | 9/1999 | Eggleston et al. ............ 709/219 |
| 6,067,561 A | 5/2000 | Dillon ........................... 709/206 |
| 6,138,146 A | 10/2000 | Moon et al. ................... 709/206 |
| 6,195,686 B1 | 2/2001 | Moon et al. ................... 709/206 |
| 6,219,694 B1 | 4/2001 | Lazaridis et al. ............. 709/206 |
| 6,363,412 B1 | 3/2002 | Niwa et al. .................... 709/203 |
| 6,393,296 B1 | 5/2002 | Sabnani et al. ............... 455/466 |
| 6,446,118 B1 | 9/2002 | Gottlieb ........................ 709/217 |
| 6,449,634 B1 | 9/2002 | Capiel .......................... 709/206 |
| 6,799,033 B2 | 9/2004 | Kanefsky ................... 455/412.1 |
| 7,240,095 B1 * | 7/2007 | Lewis ........................... 709/206 |
| 2001/0029524 A1 * | 10/2001 | Smith et al. .................. 709/206 |
| 2002/0004381 A1 | 1/2002 | Theimer ....................... 455/412 |
| 2002/0022475 A1 | 2/2002 | Tsuneki et al. ............... 455/412 |
| 2002/0132606 A1 | 9/2002 | Campana, Jr. et al. ....... 455/412 |

(Continued)

FOREIGN PATENT DOCUMENTS

WO 99/65256 12/1999

OTHER PUBLICATIONS

Crispin, et al., "*Internet Message Access Protocol—Sort Extension*," IETF Standard Working Draft, Internet Engineering Task Force, Jul. 1, 2001, 10 pages.

(Continued)

*Primary Examiner* — Lester Kincaid
*Assistant Examiner* — Mehmood B Khan
(74) *Attorney, Agent, or Firm* — Allen, Dyer, Doppelt, Milbrath & Gilchrist, P.A.

(57) ABSTRACT

A communications system and method includes a mobile device having a mail user agent. A mobile office platform as a server includes a mail agent that is operative with the mail user agent for accessing one or more electronic mailboxes of the mail user agent using at least one protocol specific connector. The mobile office platform is operative for providing only the n-most recent mail headers of electronic messages to the mail user agent.

29 Claims, 3 Drawing Sheets

U.S. PATENT DOCUMENTS

| | | |
|---|---|---|
| 2002/0183044 A1 | 12/2002 | Blackwell et al. ............ 455/412 |
| 2003/0100292 A1 | 5/2003 | Kynast et al. ................. 455/412 |
| 2003/0172118 A1 | 9/2003 | Bilansky et al. ............. 709/206 |
| 2003/0182383 A1 | 9/2003 | He ............................... 709/206 |
| 2004/0143569 A1 | 7/2004 | Gross et al. ........................ 707/3 |
| 2004/0152449 A1 | 8/2004 | Koshihara .................. 455/412.1 |
| 2004/0203959 A1 | 10/2004 | Coombes ...................... 455/466 |
| 2004/0214552 A1 | 10/2004 | Matsuda ................... 455/412.1 |
| 2004/0224670 A1 | 11/2004 | Hull et al. .................. 455/412.1 |
| 2005/0130631 A1 | 6/2005 | Maguire et al. ............ 455/414.1 |
| 2006/0235945 A1* | 10/2006 | Frietas et al. ................. 709/217 |

OTHER PUBLICATIONS

Crispin, "*Internet Message Access Protocol—Version 4rev1*," IETF Standard Working Draft, Internet Engineering Task Force, Jan. 1, 2001, 93 pages.

\* cited by examiner

SYSTEM AND METHOD OF RETRIEVING ELECTRONIC MAIL

RELATED APPLICATION

This application is a continuation of Ser. No. 10/780,258 filed on Feb. 17, 2004, now U.S. Pat. No. 8,005,462 the disclosure of which is hereby incorporated by reference in its entirety.

FIELD OF THE INVENTION

The present invention relates generally to electronic mail systems, and more particularly, this invention relates to retrieving only the more recent mail headers of electronic mail messages.

BACKGROUND OF THE INVENTION

In some communications systems, a mail user agent forms part of a mobile device, for example, a wireless phone or PDA. The device accesses one or more of its electronic mailboxes through a mail agent as part of a mobile office platform, typically a server operative between the source electronic mailboxes and wireless device. The mobile office platform acts as a window onto the electronic mailboxes of the user. These mailboxes can be accessed from the mobile office platform using one of a plurality of protocols such as the Post Office Protocol Version 3 (POP3), the Internet Mail Access Protocol (IMAP), webmail or other proprietary protocol. Additionally, the mail user agent may access the mobile office platform in one of a variety of protocols. For example, the mail office platform can be accessed using the POP3 protocol, IMAP or webmail.

The mobile office platform has a plurality of protocol specific connectors to access electronic mailboxes. For example, one connector could be a POP3 connector for accessing POP3 mailboxes, another connector could be an IMAP connector for accessing IMAP electronic mailboxes, and yet another connector could access mail from an Exchange server.

The mail user agent usually resides on a mobile device, which has limited storage capacity and limited transmission bandwidth. Some users have electronic mailboxes that receive a large number of electronic mail messages. For example, it is not uncommon for some users to have thousands of electronic mail messages contained within an electronic mailbox. Unfortunately, the POP3 protocol used by a mail user agent usually is not intelligent enough and does not have the processing power to request a subset of mail from the mobile office platform. In some instances, the mail user agent retrieves the entire list of message headers before performing any operation.

This results in a number of problems. For example, the mail user agent will not have enough space to hold the message list. Also, any new electronic mail check takes an extended period of time because any function that requires the mail user agent to look at the message list is subject to delays. Also, if a message header is 500 bytes, and the user has 5,000 electronic mail messages in an "IN" box, then on every check of new electronic mail, the mail user agent must retrieve 500 KB of data. This is an exceptionally large amount of data to be retrieved on every check of new electronic mail. Additionally, the battery life of a mobile device is drained as a result of downloading a large message list and any air time charges for the wireless device are increased because of the time required for downloading the entire message list.

Another problem arises as a result of translating from one electronic mail protocol to another electronic mail protocol. Not all electronic mail protocols support the retrieval of subsets of electronic mail headers in a message list. Thus, any service that allows a mail user agent transparent access to electronic mailboxes implemented in a plurality of electronic mail protocols will run into the problem of having to retrieve or store a large number of message headers for uses that have a large number of electronic mail messages. If only protocols that allow retrieval of subsets of electronic mail headers from electronic messages were used, then some of these problems would be eliminated. For example, with IMAP, there would be no problems with (a) new mail checks taking extended periods of time, (b) battery life drainage and (c) increased air charges, because the IMAP would only request a subset of the electronic message list. There would still be a problem, however, with the limited space to hold the data pertaining to the message list in the mobile device and its mail user agent. The mail user agent would have to store the entire message list on the mobile device.

SUMMARY OF THE INVENTION

The present invention solves these aforementioned problems by allowing the mobile office platform and its mail agent to provide only the n-most recent mail headers to a device. This effectively translates the mailbox size from a large mailbox to a small mailbox that can easily fit on the mobile device and be easily manipulated given the limited connection bandwidth. A virtual mailbox is thus formed that is confined to a moving window within the user's mailbox.

In accordance with one aspect of the present invention, the communications system of the present invention includes a mobile device having a mail user agent. The mobile office platform is operative with the mail user agent for accessing one or more electronic mailboxes of the mail user agent using at least one protocol specific connector. This mail office platform is also operative for providing only the n-most recent mail headers of electronic mail messages to the mail user agent.

In another aspect of the present invention, the mobile office platform is operative to provide only the n-most recent mail headers in a default order of mail headers provided by the electronic mail protocol used for accessing an electronic mailbox. The message header could be the unique identifier (UID) of an electronic mail message. The mobile office platform can be operative to provide only the n-most recent mail headers in an order based on associative information about the electronic mail provider and/or electronic mailbox to be accessed. A database can be associated with the mail office platform and contain records of associative information for electronic mail providers and/or electronic mailboxes to be accessed. This associative information could be the name of the electronic mail protocol used for accessing an electronic mailbox, the version of the electronic mail protocol used for accessing an electronic mailbox, the name of an electronic mail server, including the name of the electronic mail server applicable to an electronic mail protocol, or the domain name of an internet service provider used for accessing electronic mailboxes.

In yet another aspect of the present invention, the mobile office platform can be operative for downloading an entire message list of one or more electronic mailboxes, sorting the message headers, and extracting only the n-most recent mail messages for delivery to the mail user agent.

In another aspect of the present invention, the mobile device comprises a wireless messaging device. The mail user agent can be operative for accessing the mobile office platform using a POP, IMAP or webmail protocol. The plurality of protocol specific connectors can comprise a POP connector for accessing POP mailboxes, an IMAP connector for accessing IMAP mailboxes, or a connector for accessing mail from an exchange server.

A method aspect is also disclosed for retrieving electronic mail. In one aspect of the present invention, it comprises the steps of accessing one or more electronic mailboxes of a mail user agent using at least one protocol specific connector and providing a mail user agent of a mobile device only the n-most recent mail headers of electronic mail messages that had been accessed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously overcomes the disadvantages of the prior art that was limited to those systems that would retrieve an entire list of message headers before performing any operation or translating from one mail protocol to another in which different protocols could not support retrieval of subsets of mail headers in a message list. The present invention is operative to provide the n-most recent mail headers to a preferred mobile device and translate the mailbox size from a large mailbox to a small mailbox that will easily fit on the mobile device and can be easily manipulated given the limited connection bandwidth typical with these devices. The present invention can be accomplished by having a server operative as a mobile office platform download the entire message list, sort the message list, and extract the n-most recent mail headers and send them to the mobile device. Alternatively, the mobile office platform could retrieve the n-most recent mail headers from a source mailbox based on the electronic mail protocol, for example, by using a default message list order and then transfer the n-most recent mail headers. Also, associative data could be used to aid in retrieving the n-most recent mail headers. This associative data could be the name of an electronic mail protocol, a version of the electronic mail protocol, the name of an electronic mail server, or the domain name of an internet service provider, as non-limiting examples.

In one aspect of the present invention, the message header that is downloaded could be a unique identifier (UID) common for electronic mail messages. It is also possible that the mobile office platform could view a last item, a second-to-last item, and other previous items, compare time stamps, and decide what order for mail headers is to be implemented. The mail user agent in a mobile device could be a cellular phone, wireless personal digital assistant, wireless email device, or other mobile and/or wireless devices.

Figure 1:
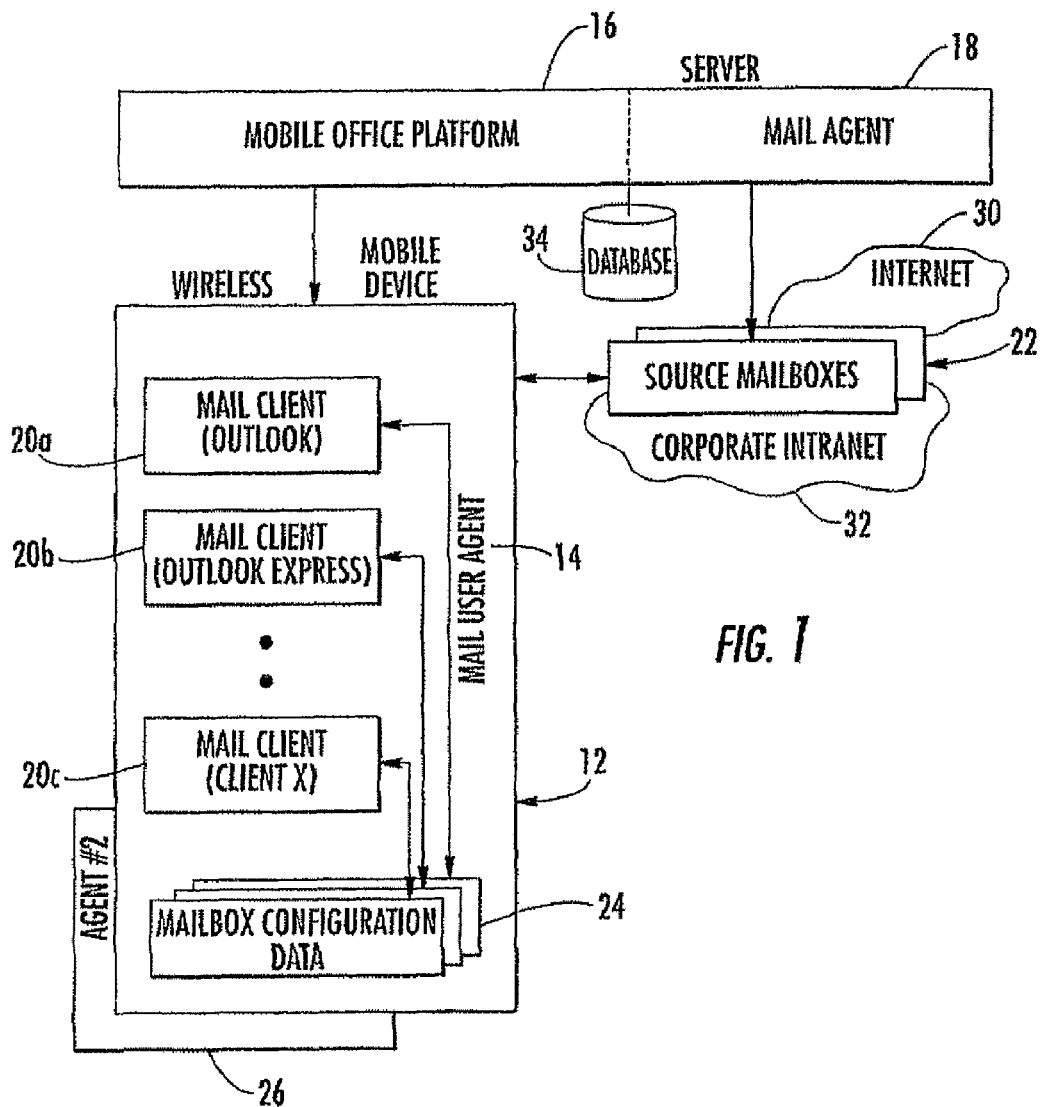
FIG. 1 is a high level block diagram of a system that includes a mobile office platform as a server that includes a mail agent operative with a mail user agent as part of a mobile device such that the mail agent accesses one or more electronic mailboxes of the mail user agent using at least one protocol specific connector and provides only the n-most recent mail headers of electronic mail messages to the mail user agent.

FIG. 1 shows a high-level block diagram of basic communications system 10 used for retrieving electronic mail and most notably, in accordance with the present invention, providing only the n-most recent mail headers, for example, unique identifiers (UID's) of electronic mail messages to a mail user agent. FIG. 1 shows electronic mailboxes as source mailboxes and sets forth an example of the type of functional components that can be used in the present invention. As illustrated, a mobile device 12 includes a mail user agent 14 operative with a server as a mobile office platform 16, in one aspect of the present invention. The mobile device 12 could be a wireless device, including a cell phone, Personal Digital Assistant (PDA), Blackberry unit, or other device as examples of user systems. Other systems, including a personal computer or other device, are also operable with the present invention. The mobile office platform 16 is typically a server that acts as a mailbox interface module and includes a mail agent 18 and communicates with source mailboxes 20. The wireless device 12 as a mail user agent 14 could include various email clients, which in this example correspond to an Outlook mail client 20a, an Outlook Express mail client 20b, and a proprietary mail client 20a for client X, each associated with respective source mailboxes 22. The mail user agent 14 could also include mailbox configuration data 24 for each of the email clients. It should be understood that the various email clients could be located on different agent systems as part of one or more wireless devices, as illustrated by the second agent system 26, each having a mail user agent.

The mail user agent 14 is operative with the mobile office platform acting 16 as an agent for the wireless device to the source mailboxes. The source mailboxes 22 could be located on the internet 30, a corporate internet 32, or both. The mobile office platform 16 acts as an agent, performs various functions, and includes various functional and validator modules. It should also be understood that some of the functions of the mobile office platform as an agent could also be downloaded to the user system and operative by the user, as when inputting information into a mobile device or home computer.

As illustrated, the mail agent 18 is operative with a database 34 that stores associative information about the electronic mail provider and/or electronic mailbox to be assessed. This associative information stored in the database 34 could include the name of the electronic mail protocol used for accessing an electronic mailbox, the version of the electronic mail protocol, the name of the electronic mail server, its applicability to the protocol and the domain name of an internet service provider used for accessing electronic mailboxes, as non-limiting examples. It should be understood that the present invention is not limited to these items, but the associative information can include any type of information that is helpful to access the electronic mailbox and determine the most recent mail headers of electronic messages and provide only the n-most recent mail headers of electronic mail messages to a mail user agent.

The message header, in one aspect of the invention, could be a unique identifier (UID) of an electronic mail message. Although the associative information could be used to determine order of mail header retrieval, it should be understood that in some protocols, the n-most recent mail header can be provided in a default order of mail headers provided by the electronic mail protocol. Thus, associative information would not be required. In other cases, even associative information is not available depending on the type of internet service provider and the type of electronic mail protocol used. Thus, the entire message list for one or more electronic mailboxes must be downloaded to the mobile office platform, the message header sorted, and only the n-most recent mail messages extracted for delivery to a mail user agent.

The mail user agent can be operative for accessing the mobile office platform using a POP, IMAP, or webmail protocol. The different protocol specific connectors could be a POP connector for accessing POP mailboxes and IMAP connector for accessing IMAP mailboxes or a connector for accessing mail from an exchange server.

It should be understood that the software and programming used for the present invention can vary, and different applications can be used. The mobile office platform 16 can use web services technology and include different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Any type of arrangement can be used to access the mobile office platform 16, including a peer-to-peer arrangement, a central server, or other architecture and line or wireless communications. Also, middleware could be used. Data formats could be standardized and data exchanged using the extensive mark-up language (XML), which is a foundation for the web services description language (WSDL). Different web servers could be used, including the open source Apache or Microsoft's internet information server (IIS). Other web services could include Novel's web server for users of its netware operating system or the IBM family of Lotus domino service, for example, for IMB's OS/390 and AS/400 customers. Naturally, any web server should be able to download requests for file transfer protocol (FTP) files in a preferred embodiment.

The mobile office platform 16 can have various import agents that are designed to retrieve configuration data from email clients, including Eudora and Netscape besides the Outlook and Outlook Express email clients as illustrated. The mobile office platform could include a Messaging Application Programming Interface (MAPI) to retrieve any configuration data for a MAPI-compliant email client. MAPI provides the application programming interface (API) to ensure system independence for messaging applications. A layer of functionality could be provided between applications at any underlying messaging systems and act as messaging middleware. MAPI-compliant applications could communicate through a MAPI subsystem to MAPI service providers that perform requested actions for clients and pass data back through a MAPI system to a MAPI client. Any mailbox configuration data could reside in a configuration registry of the user system. In other example embodiments, data could reside in email client specific configuration storage.

In the user system, the Microsoft Outlook Express mail client can access source mailboxes that use the Post Office Protocol (POP) or Internet Mail Access Protocol (IMAP). POP, of course, is the internet mail server protocol that provides incoming message storage. The more recent protocol is POPS. POP is operative with a Simple Mail Transfer Protocol (SMTP). Any mail server could run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail service, of course, run SMTP and either POP or IMAP and receives incoming messages from any source without identity checking. Thus, mail can be selectively downloaded and read, message headers reviewed, hierarchical message stores built, an address book supported, and documents linked, authenticated and searched.

The mobile office platform could generate configuration data objects and format data objects using an extensible mark-up language (XML) for submission to various XML-compliant web services. The server and/or web service could be a simple object access protocol (SOAP) compliant service.

XML, of course, as an extensive mark-up language, is a subset of the standard generalized mark-up language (SGML) and would allow data to be stored and published on websites and be richer in presentation. Custom tags could be created to define the content of documents. Common information formats could be created and the format and data shared on the Internet, corporate internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The mobile office platform 16 could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an internet or corporate intranet. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

Figure 2:
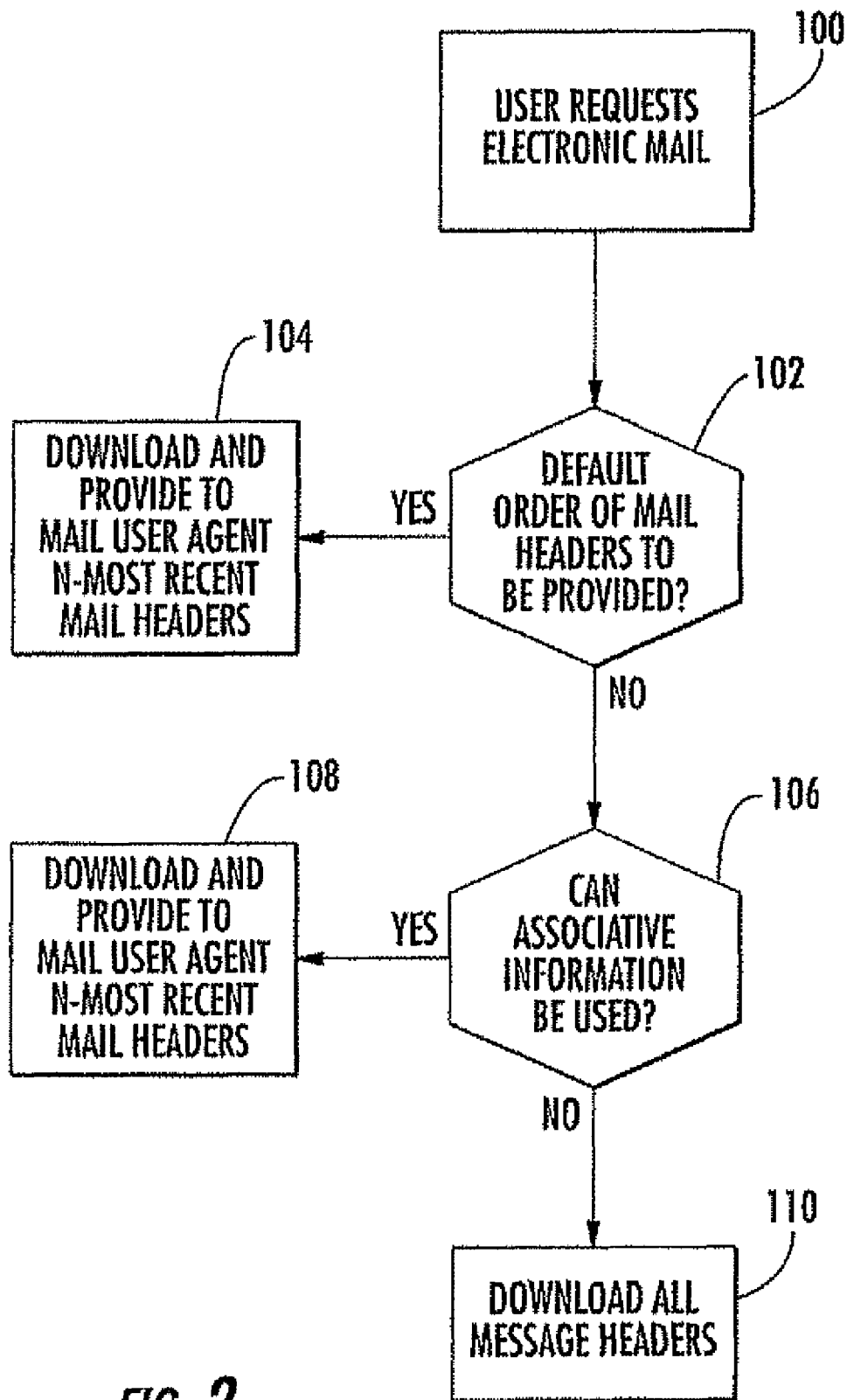
FIG. 2 is a high level flow chart showing an example of the method that can be used in the present invention.

FIG. 2 is a high-level block diagram showing an example of the method of the present invention. Reference numerals begin in the 100 series. As shown in FIG. 2, a user first requests electronic mail from a user mailbox (block 100). The mobile office platform determines if the protocol used for accessing the electronic mailbox specifies a default message list order (block 102), and if it does, then the n-most recent mail headers of electronic messages are downloaded to a mail user agent of a mobile device (block 104). If the protocol is not specific, then the mobile office platform determines if associative information can be used (block 106). If not, then the entire message list is downloaded, the message headers sorted, and only the n-most recent mail messages for delivery to a mail user agent are extracted (block 108).

An exemplary hand-held mobile wireless communications device 1000 that can be used in the present invention is further described in the example below with reference to FIG. 3. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 3:
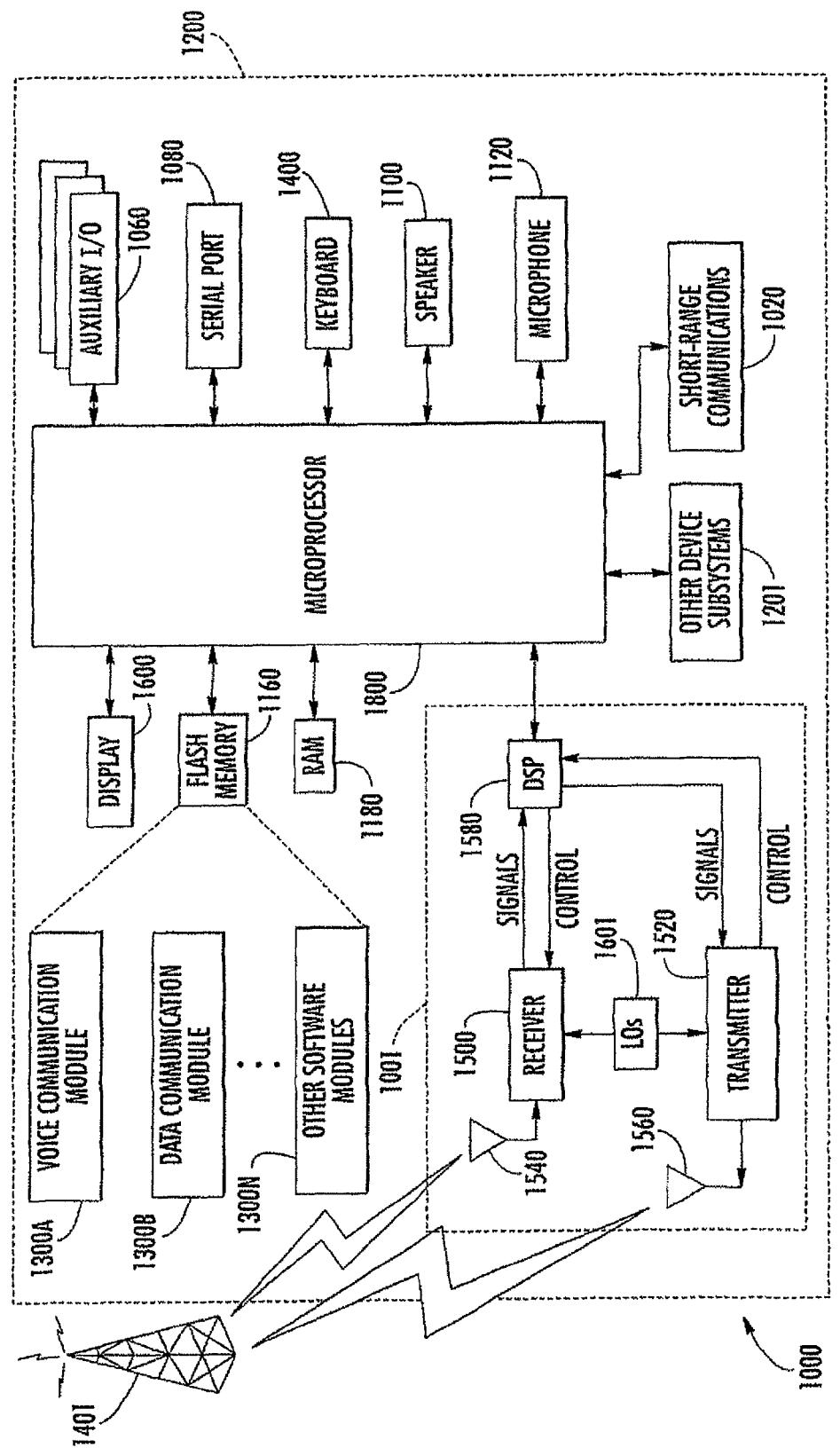
FIG. 3 is a schematic block diagram illustrating an exemplary mobile wireless communications device for use in the present invention.

In addition to the processing device 1800, other parts of the mobile device 1000 are shown schematically in FIG. 3. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile communications system comprising: a mobile device; and
    a mobile office platform operating with the mobile device for accessing a plurality of electronic mailboxes,
    when an electronic mail protocol used for accessing the plurality of electronic mailboxes specifies a default message list order, the mobile office platform is configured for downloading and providing n-most recent mail headers of electronic messages to the mobile device; and
    when the electronic mail protocol does not specify the default message list order, the mobile office platform is configured for using stored associative information about an electronic mail provider or the plurality of electronic mailboxes to download and provide the n-most recent mail headers; and
    when the associative information cannot be used, the mobile office platform is configured for downloading all mail headers for the plurality of electronic mailboxes and providing the n-most recent mail messages to the mobile device.

2. The mobile communications system according to claim 1, wherein said message header comprises a unique identifier (UID) of an electronic mail message.

3. The mobile communications system according to claim 1, and further comprising a database associated with said mobile office platform and containing records of associative information for electronic mail providers and/or electronic mailboxes to be accessed.

4. The mobile communications system according to claim 1, wherein said associative information comprises the name of the electronic mail protocol used for accessing an electronic mailbox.

5. The mobile communications system according to claim 1, wherein said associative information comprises the version of the electronic mail protocol used for accessing an electronic mailbox.

6. The mobile communications system according to claim 1, wherein said associative information comprises the name of the electronic mail server.

7. The mobile communications system according to claim 6, wherein the name of the electronic mail server is applicable to a specific electronic mail protocol used for accessing an electronic mailbox.

8. The mobile communications system according to claim 1, wherein said associative information comprises the domain name of an internet service provider used for accessing electronic mailboxes.

9. The mobile communications system according to claim 1, wherein said mobile device comprises a wireless device.

10. The mobile communications system according to claim 1, wherein said mail user agent is operative for accessing the mobile office platform using a POP, IMAP or webmail protocol.

11. The mobile communications system according to claim 1, wherein said plurality of protocol specific connectors comprise a POP connector for accessing POP mailboxes, an IMAP connector for accessing IMAP mailboxes, or a connector for accessing mail from an Exchange server.

12. A mobile communications system comprising:
    a server operating with a mobile device configured to access a plurality of electronic mailboxes;
    a database associated with the server and containing associative information about an electronic mail provider and the plurality of electronic mailboxes;
    when an electronic mail protocol used for accessing the plurality of electronic mailbox specifies a default message list order, the server is configured for downloading and providing n-most recent mail headers of electronic messages to the mobile device
    and when the electronic mail protocol does not specify the default message list order,
    the server is configured for using the stored associative information about the electronic mail provider or the plurality of electronic mailboxes to download and provide the n-most recent mail headers, and
    when the associative information cannot be used, the server is configured for downloading all mail headers for the plurality of electronic mailboxes and providing the n-most recent mail messages to the mobile device.

13. The mobile communications system according to claim 12, wherein said message header comprises a unique identifier (UID) of an electronic mail message.

14. The mobile communications system according to claim 12, wherein said associative information comprises the name of the electronic mail protocol used for accessing an electronic mailbox.

15. The mobile communications system according to claim 12, wherein said associative information comprises the version of the electronic mail protocol used for accessing an electronic mailbox.

16. The mobile communications system according to claim 12, wherein said associative information comprises the name of the electronic mail server.

17. The mobile communications system according to claim 16, wherein the name of the electronic mail server is applicable to a specific electronic mail protocol used for accessing an electronic mailbox.

18. The mobile communications system according to claim 12, wherein said associative information comprises the domain name of an internet service provider used for accessing electronic mailboxes.

19. The mobile communications system according to claim 12, wherein said mobile device comprises a wireless device.

20. The mobile communications system according to claim 12, wherein said mail user agent is operative for accessing the mobile office platform using a POP, IMAP or webmail protocol.

21. The mobile communications system according to claim 12, wherein said plurality of protocol specific connectors comprise a POP connector for accessing POP mailboxes, an IMAP connector for accessing IMAP mailboxes, or a connector for accessing mail from an Exchange server.

22. A method of retrieving electronic mail in a mobile communications system, the method comprising the steps of:
    operating a mobile office platform with a mobile device for accessing a plurality of electronic mailboxes; and
    accessing the plurality of electronic mailboxes using an electronic mail protocol specifying a default message list order,
    downloading and providing to the mobile device by the mobile office platform n-most recent mail headers of electronic mail messages in a default order of mail headers provided by the electronic mail protocol used for accessing the plurality of electronic mailboxes, and when not specifying the default message list order by the electronic mail protocol,
    using stored associative information about an electronic mail provider or the plurality of electronic mailboxes by the mobile office platform to download and provide the n-most recent mail headers, and
    downloading all mail headers for the plurality of electronic mailboxes and providing the n-most recent mail messages to the mail user agent by the mobile office platform when the associative information cannot be used.

23. A method of retrieving electronic mail in a mobile communications system according to claim 22, wherein said message header comprises a unique identifier of an electronic mail message.

24. A method of retrieving electronic mail in a mobile communications system according to claim 22, and further comprising the step of storing associative information within a database.

25. A method of retrieving electronic mail in a mobile communications system according to claim 22, wherein said associative information comprises the name of the electronic mail protocol used for accessing an electronic mailbox.

26. A method of retrieving electronic mail in a mobile communications system according to claim 22, wherein said associative information comprises the version of the electronic mail protocol used for accessing an electronic mailbox.

27. A method of retrieving electronic mail in a mobile communications system according to claim 22, wherein said associative information comprises the name of the electronic mail server.

28. A method of retrieving electronic mail in a mobile communications system according to claim 27, wherein the name of the electronic mail server is applicable to a specific electronic mail protocol used for accessing an electronic mailbox.

29. A method of retrieving electronic mail in a mobile communications system according to claim 22, wherein said associative information comprises the domain name of an internet service provider used for accessing electronic mailboxes.

* * * * *